(12) United States Patent
Mathonet et al.

(10) Patent No.: US 9,751,365 B2
(45) Date of Patent: Sep. 5, 2017

(54) HIGH MILEAGE TRUCK TIRE TREAD

(75) Inventors: Vincent Benoit Mathonet, Habay la Neuve (BE); Philippe Joseph Auguste Muller, Champion (BE); Laurent Luigi Domenico Colantonio, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 830 days.

(21) Appl. No.: 13/231,526

(22) Filed: Sep. 13, 2011

(65) Prior Publication Data
US 2013/0061992 A1    Mar. 14, 2013

(51) Int. Cl.
*B60C 11/04* (2006.01)
*B60C 11/03* (2006.01)
*B60C 11/12* (2006.01)

(52) U.S. Cl.
CPC ....... *B60C 11/04* (2013.01); *B60C 2011/0353* (2013.01); *B60C 2011/0388* (2013.01); *B60C 2011/1209* (2013.01); *B60C 2200/06* (2013.01)

(58) Field of Classification Search
CPC ............. B60C 11/04; B60C 2011/0353; B60C 2011/0388
USPC ................................... 152/209.18, 900, 901
See application file for complete search history.

(56) References Cited

U.S. PATENT DOCUMENTS

| | | | |
|---|---|---|---|
| 3,799,230 A | 3/1974 | Montagne | 152/209 R |
| 3,897,813 A | 8/1975 | Verdier | 152/209 R |
| 4,281,702 A * | 8/1981 | Grosch et al. | 152/209.18 |
| D396,676 S | 8/1998 | Croyle | D12/147 |
| 6,213,181 B1 * | 4/2001 | Janajreh | 152/901 |
| 2005/0000613 A1 * | 1/2005 | Maruoka et al. | 152/209.1 |
| 2005/0016656 A1 * | 1/2005 | Kuroki et al. | 152/548 |

FOREIGN PATENT DOCUMENTS

| | | | | |
|---|---|---|---|---|
| GB | 2038729 A | * | 7/1980 | |
| JP | 60064003 | | 4/1985 | ............. B60C 11/06 |
| JP | 61143205 | | 6/1986 | ............. B60C 11/06 |
| JP | 63-106111 A | * | 5/1988 | |
| JP | 63-166606 A | * | 7/1988 | |
| JP | 02-114004 A | * | 4/1990 | |
| JP | 05-246215 A | * | 9/1993 | |
| JP | 2003211914 | | 7/2003 | ............. B60C 11/00 |

(Continued)

OTHER PUBLICATIONS

Machine translation for Japan 05-246215 (no date).*

(Continued)

*Primary Examiner* — Steven D Maki
(74) *Attorney, Agent, or Firm* — Edward T. Kennedy

(57) ABSTRACT

A vehicle wheel tire having a symmetrical five rib tread construction with adjacent tread ribs comprising the tread separated by circumferential grooves. The intermediate tread grooves have an axial width wider than an axial width of the shoulder grooves and a center rib has an axial width wider than the axial widths of the intermediate ribs and the shoulder ribs. The axial width of the center rib, intermediate ribs, and shoulder ribs are within a prescribed preferred range of a total tread axial width and the axial width of each intermediate groove is within a prescribed preferred range of total tread axial width.

8 Claims, 6 Drawing Sheets

(56) References Cited

FOREIGN PATENT DOCUMENTS

JP  2006-111138 A  *  4/2006

OTHER PUBLICATIONS

Machine translation for Japan 2006-111138 (no date).*
Derwent abstract for Japan 02-114004 (no date).*
Translation for Japan 02-114004 (no date).*
European Search Report received by Applicants dated Jan. 2, 2013.

* cited by examiner

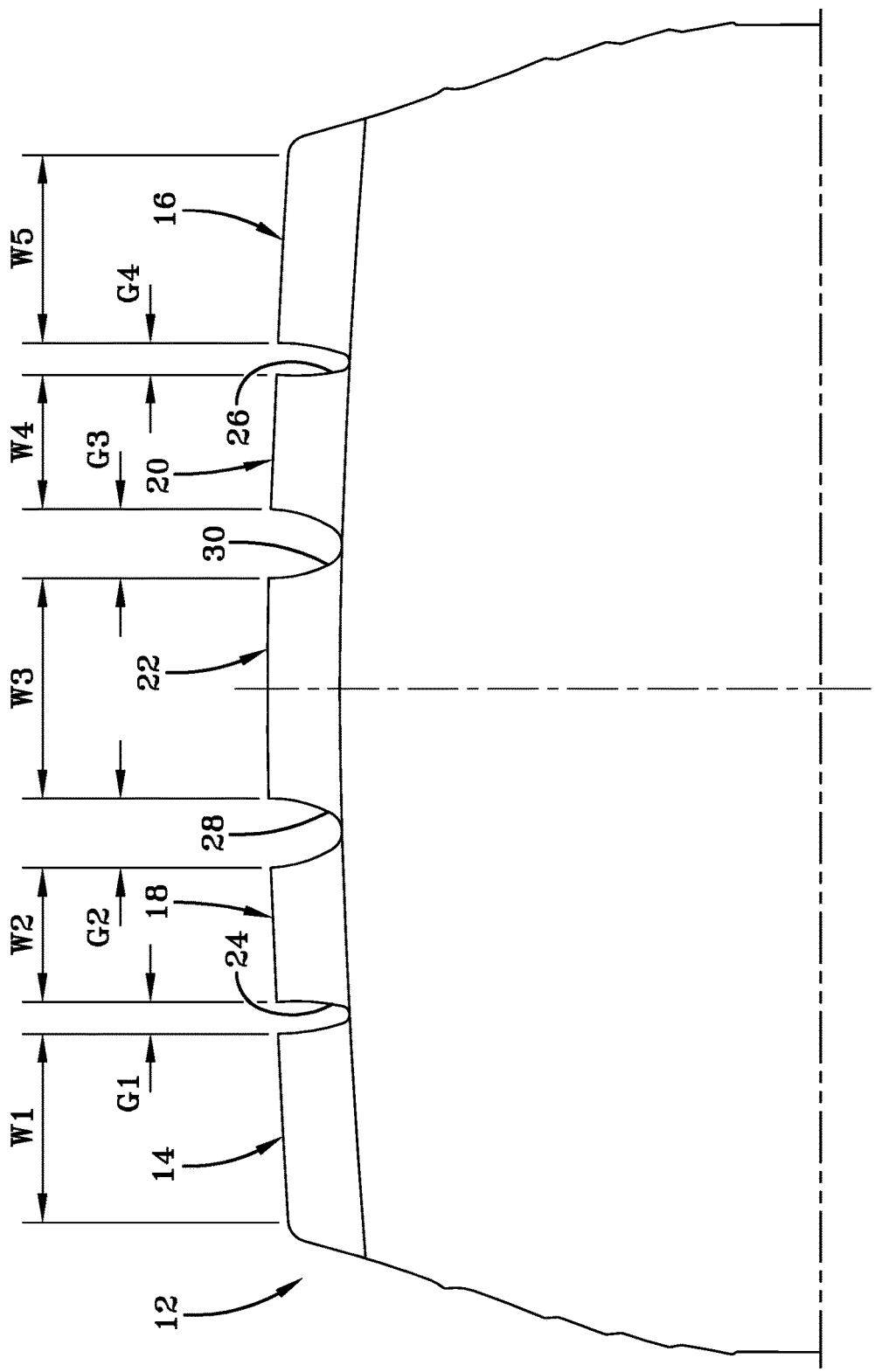

HIGH MILEAGE TRUCK TIRE TREAD

FIELD OF THE INVENTION

The invention relates generally to vehicle tires and, more specifically, to a tread pattern for truck tires intended to provide high mileage tread capability.

BACKGROUND OF THE INVENTION

Commercial truck steer tires are required to provide a suitable level of wet and snow performance while rolling resistance performance and fuel mileage efficiency achieved by the tire is maintained. Moreover, it is desired that such tires provide a high level of cornering stiffness and resistance to tread wear in order to prolong the useful life of the tire tread. Accordingly, there is a need for a commercial truck tire having a tread pattern that functionally meets such competing objectives to thereby provide the user with acceptable overall tire performance.

SUMMARY OF THE INVENTION

According to an aspect of the invention, a vehicle wheel tire is configured having a symmetrical five rib tread construction with adjacent tread ribs separated by circumferential grooves. Pursuant to the invention, the intermediate tread grooves have an axial width wider than an axial width of the shoulder grooves and a center rib has an axial width wider than the axial widths of the intermediate ribs and the shoulder ribs.

In a further aspect, the axial width of the center rib, intermediate ribs, and shoulder ribs are within a prescribed preferred range of a total tread axial width and the axial width of each intermediate groove is within a prescribed preferred range of total tread axial width.

The tread, in another aspect, is constructed to be symmetrical about an equatorial centerline with the ribs and grooves having the prescribed preferred axial widths.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 6 is a sectional view of the tire tread.

DETAILED DESCRIPTION OF THE INVENTION

Figure 1:
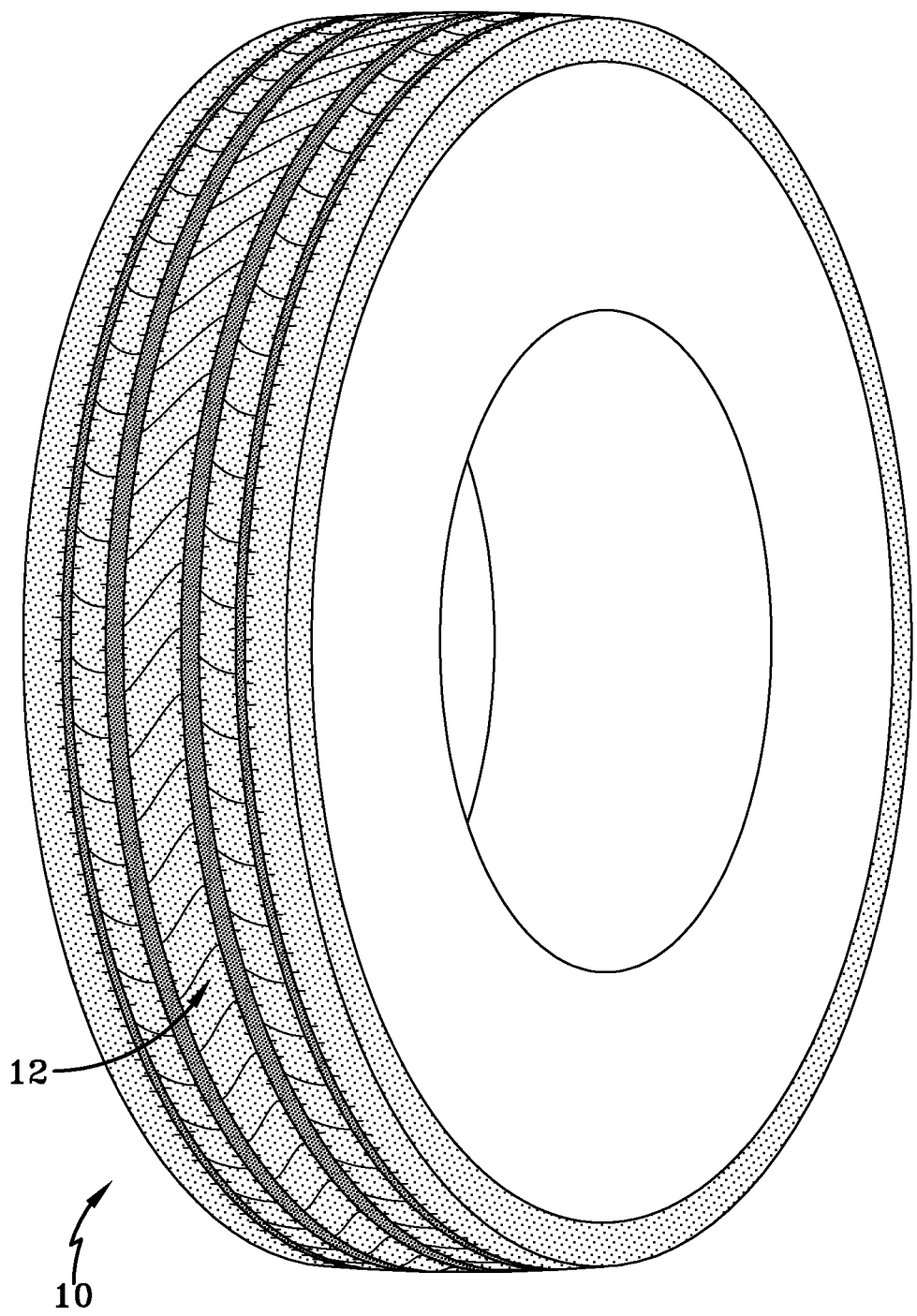
FIG. 1 is a isometric view of a tire including a tire tread.

With initial reference to FIGS. 1, 2, 3, 4 and 6, a tire 10 is constructed by conventional means having a circumferential tread 12. The tread 12 preferably is symmetrical about an equatorial centerline and has five circumferential spaced apart ribs including a pair of shoulder ribs 14, 16; a pair of intermediate ribs 18, 20, and a center rib 22 on the equatorial centerline. Adjacent shoulder ribs and the intermediate ribs are separated respectively by circumferential continuous grooves 24, 26 and the intermediate ribs are separated respectively from the center rib by intermediate grooves 28, 30.

Figure 2:
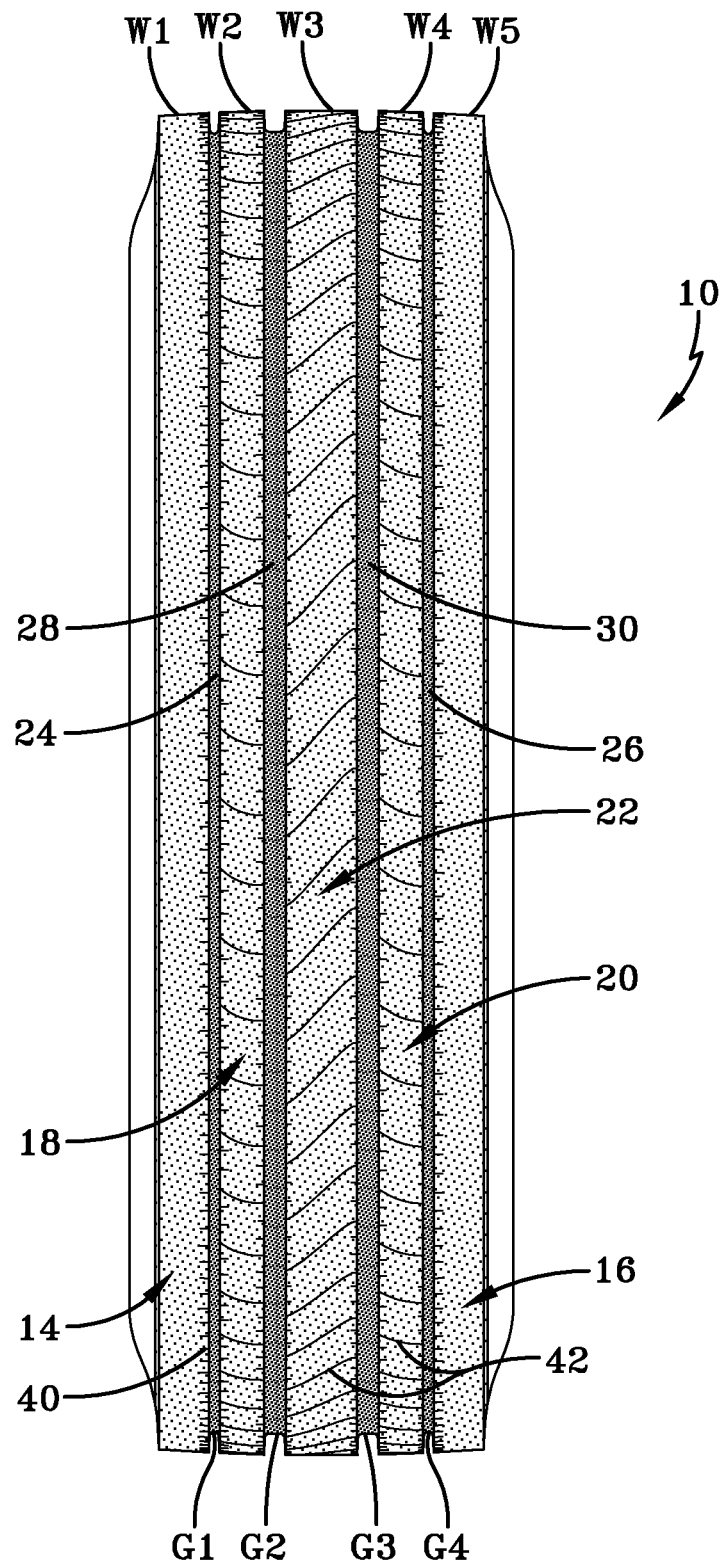
FIG. 2 is a plan view of the tire tread.
Figure 3:
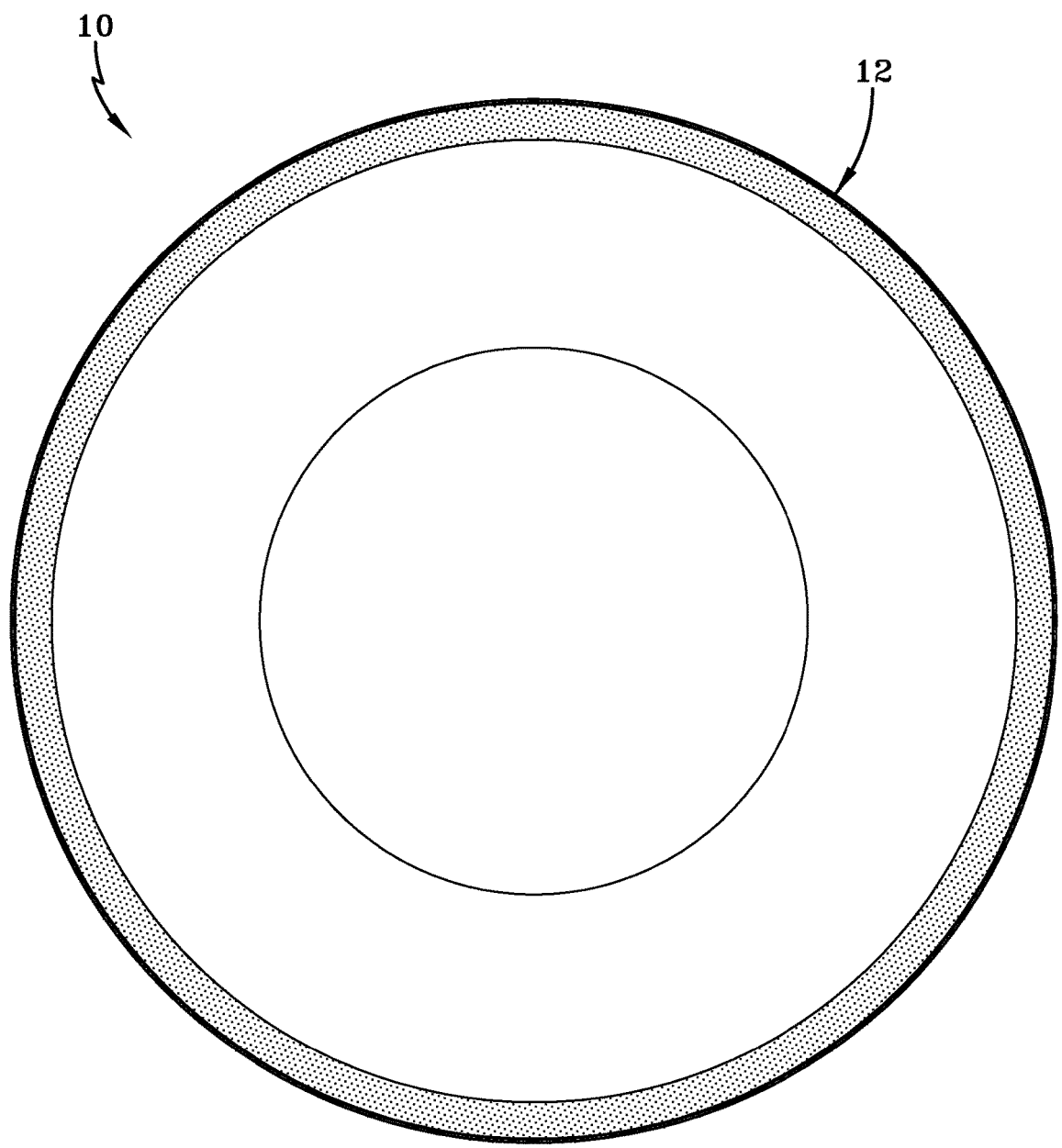
FIG. 3 is side elevation view of the tire and tread.
Figure 4:
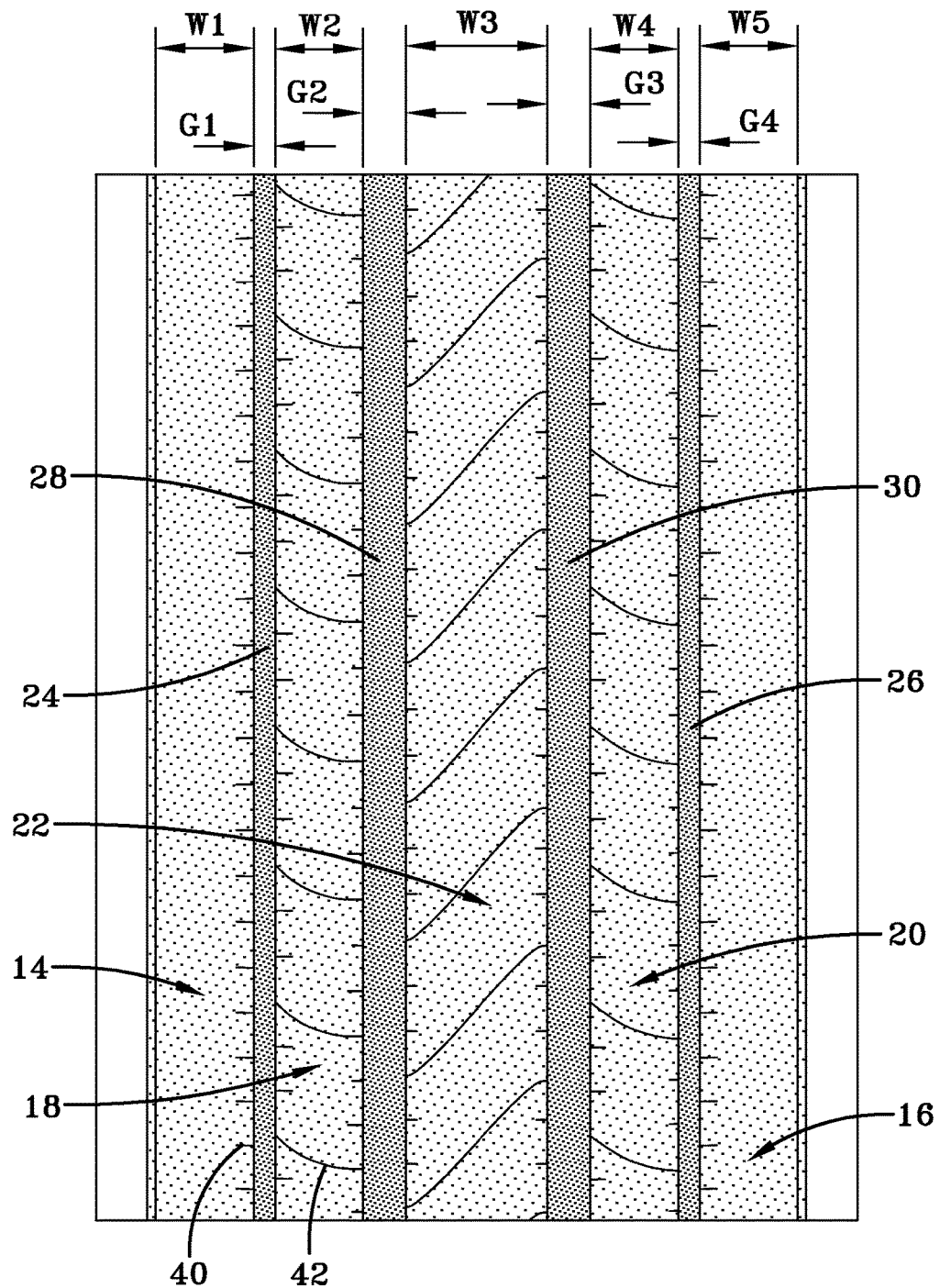
FIG. 4 is an enlarged isometric view of a tread portion.

The tread 12 has an overall axial width equating to the individual widths of the five circumferential ribs and four circumferential grooves. In FIG. 2, the widths W1, W2, W3, W4, and W5 are identified as the respective axial widths of ribs 14, 18, 22, 20, and 16. Groove widths G1, G2, G3, and G4 are identified likewise to correspond to the respective axial widths of grooves 24, 28, 30, and 26. From FIG. 2, it will be noted that axial widths of the grooves and ribs are differentiated across the axial width of the tread. The central rib 22 is provided with a width wider than the adjacent intermediate ribs 18, 20 and shoulder ribs 14, 16, with the center rib 22 axial width W3 preferably being within a range of 17 to 22 percent of a total tread axial width. The axial widths W2, W4 of the intermediate ribs 18, 20 each are preferably being within a range of 10 to 15 percent of a total tread axial width; and the shoulder ribs 14, 16 have respective axial widths W1, W5, each preferably within a range of 17 to 21 percent of a total tread axial width. It will further be noted that the intermediate grooves 28, 30 are wider than the shoulder grooves 24, 26. Intermediate grooves 28, 30 have respective axial widths G2 and G3, each preferably within a range of 4 to 9 percent of a total tread axial width. The axial widths G1 and G4 of the shoulder grooves 24, 26, each preferably are within a range of 2 to 4 percent of a total tread axial width.

The shoulder ribs 14, 16, intermediate ribs 18, 20, and center rib 22 have a series of edge siping 40 along respective edges abutting the circumferential grooves. Additionally, the intermediate ribs 18, 20 and center rib 22 each have a circumferential series of lateral blading 42 extending edge-to-edge across the ribs.

Figure 5:
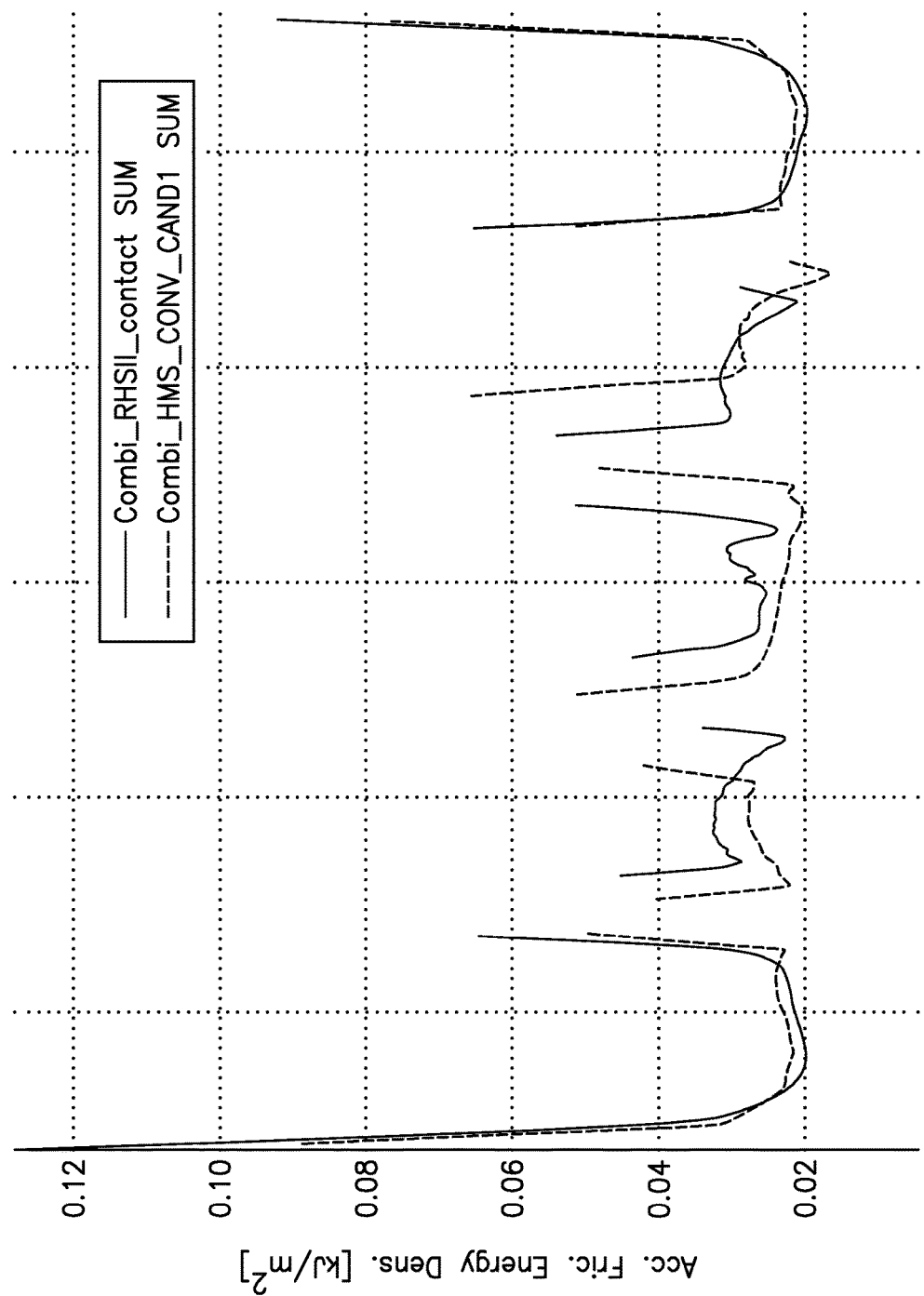
FIG. 5 is a graph of Frictional Energy Density for the five rib configuration of the tread.

The above five rib tire tread 12 results in a tire having enhanced mileage performance by reducing the overall frictional energy generated through tire use when cornering and braking. FIG. 5 represents a graph of accumulated frictional energy density [kJ/m$^2$] for a conventional rib width distribution (solid line) and for the rib width distribution discussed in the present invention (broken line). Only the rib width distribution differentiates both designs; the global cavity shape is identical. As shown in the FIG. 5 graph, the subject five tread rib configuration constructed with the rib and groove axial widths within respective preferred ranges set forth above, reduces overall accumulated frictional energy density in the tread. By reducing frictional energy density, wear to the tread 12 is reduced and the tire tread accordingly is more resistant to wear. A longer lasting tread region increases the mileage capability of the tire and provides superior value to the end user. Moreover, the shape of the tire tread reduces shoulder wear and in the meantime irregular wear processes since the shoulder region is stiffened by a higher density of tread. This is demonstrated by an even frictional energy density distribution along the tread width. The tire tread accordingly wears more evenly across its axial footprint. In addition to the improved mileage attained by the tire, the five rib construction results in improved cornering stiffness. Since cornering forces are a major factor in tread wear, increasing cornering stiffness likewise adds to improvement in tire tread mileage.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire tread comprising a center rib, first and second intermediate ribs on opposite lateral sides of the center rib and separated from the center rib respectively by first and second intermediate circumferential grooves, and first and second shoulder ribs on opposite axially outward sides respectively of the first and second intermediate ribs and separated from respective intermediate ribs by first and second circumferential shoulder grooves; the intermediate grooves each having an axial width wider than an axial width of the shoulder grooves, and the center rib having an axial width wider than a respective axial width of the intermediate ribs and the shoulder ribs, wherein the central rib has an axial width within a range of 18 to 21 percent of the total tread axial width, the axial widths of the intermediate ribs are each within a range of 10 to 15 percent of the total tread axial width, the shoulder ribs have respective axial widths each within a range of 17 to 21 percent of the total tread axial width, the intermediate grooves have respective axial widths each within a range of 4 to 9 percent of the total tread axial width, and the axial widths of the shoulder grooves are each within a range of 2 to 4 percent of the total tread axial width.

2. The tire tread of claim 1, wherein the axial width of each intermediate groove is within a range of from 4 to 8.5 percent of the total tread axial width.

3. The tire tread of claim 1, wherein the axial width of each of the intermediate ribs is within a range of from 11 to 14 percent of the total tread axial width.

4. The tire tread of claim 1, wherein the tread is a symmetric tread with respect to the equatorial plane of the tread.

5. The tire tread according to claim 1, wherein the axial width of the center rib is within a range of 19.25 to 19.75 percent of a total tread axial width.

6. The tire tread of claim 5, wherein the axial width of each of the intermediate ribs (18, 20) is within a range of from 12 to 13 percent of the total tread axial width.

7. The tire tread of claim 6, wherein the axial width of each intermediate groove is within a range of from 6 to 6.5 percent of a total tread axial width.

8. The tire tread of claim 7, wherein the axial width of each shoulder groove is within a range of 2 to 3.5 percent of a total tread axial width.

\* \* \* \* \*